United States Patent [19]
Winter et al.

[11] Patent Number: 5,129,505
[45] Date of Patent: Jul. 14, 1992

[54] PAPER METERING DEVICE

[75] Inventors: Gregory C. Winter, Alpena; Joseph A. Wozniak, Jr., Lachine, both of Mich.

[73] Assignee: Ameri-Shred Industrial Corp., Alpena, Mich.

[21] Appl. No.: 649,860

[22] Filed: Feb. 1, 1991

[51] Int. Cl.⁵ .............................................. B65G 47/12
[52] U.S. Cl. ..................... 198/455; 198/622; 198/658
[58] Field of Search ............. 198/454, 455, 622, 623, 198/658

[56] References Cited

U.S. PATENT DOCUMENTS

| | | | |
|---|---|---|---|
| 265,769 | 10/1882 | Dillman | 198/622 |
| 532,623 | 1/1895 | Wright | 198/623 |
| 1,259,524 | 3/1918 | Kelly. | |
| 1,941,938 | 1/1934 | Heinemann. | |
| 2,737,997 | 3/1956 | Himmelheber et al.. | |
| 3,147,883 | 9/1964 | Jakobson. | |
| 3,236,355 | 2/1966 | Barnard et al.. | |
| 3,512,662 | 5/1970 | Strydom. | |
| 4,023,669 | 5/1977 | Clarke. | |
| 4,060,167 | 11/1977 | Smith | 198/622 |
| 4,984,678 | 1/1991 | Fauchard | 198/658 |

*Primary Examiner*—Joseph E. Valenza
*Attorney, Agent, or Firm*—Warner, Norcross & Judd

[57] ABSTRACT

A paper metering device is disclosed which is adapted for handling a flow of bulky and unmanageable paper such as newspapers or computer printouts and metering the paper into a manageable flow for delivery to further processing. The flow of paper is carried upward on a feed conveyor. A converging conveyor is disposed along a substantial portion of the feed conveyor at the discharge end. The upper layers of the paper contact the underside of the converging conveyor which advances the paper out the discharge end. The converging conveyor is disclosed as a plurality of disks on rotating shafts or as an endless belt. Means for sensing the height of the flow of paper under the converging conveyor is provided, such that the feed conveyor is stopped until the height of the flow is reduced. Also provided is means for jogging the feed conveyor if the feed conveyor is not restarted after a predetermined period of time. A pre-feed conveyor in the form of an inclined, rotating cylinder having internal helical vanes is provided for initial metering and unclumping of paper.

36 Claims, 4 Drawing Sheets

PAPER METERING DEVICE

BACKGROUND OF THE INVENTION

1. Field of the Invention

The present invention relates to a paper metering device, and, more particularly to a device for receiving an inflow of irregularly clumped paper items and for discharging the paper items as an even and manageable outflow.

2. Description of the Related Art

It is sometimes desired to process large quantities of unwanted paper sheet material for disposal or recycling. Common examples are the processing of newspapers, computer printouts, or file stock. The paper is often shredded as a first step in the recycling process. The waste paper is frequently delivered to the processing site randomly thrown into bins or in large stacks, clumps or bundles. It order to feed the waste paper into a shredder or other processing equipment, it is necessary to meter the paper out as a relatively uniform flow of manageable volume.

As shown in U.S. Pat. No. 3,236,355, it is known to meter a flow of mail by means of an inclined conveyor provided with a declumping roller at the top, outflow end of the conveyor. The declumping roller has a series of disks rotating on a shaft extending across the upper end of the conveyor. Pieces of mail are randomly fed into the lower, infeed end of the conveyor and are carried up to the upper end. The declumping roller, which is normally continuously rotating, is carried on a pivoting frame such that when overly tall articles or clumps of articles of mail reach the roller, the roller peels off the uppermost articles of mail and propels them forward. If even more excessively tall clumps or articles reach the roller, the roller is raised upward, triggering a switch which stops the conveyor until the height of the clump is reduced. Still taller clumps or articles stop both the conveyor and the declumping rollers for manual intervention by the operator.

The device of U.S. Pat. No. 3,236,355 is intended for use with relative small, discrete and manageable articles of mail. This device is inadequate for metering out bulky and unmanageable inflows of paper sheet articles such as newspapers and fan-folded computer printouts. Thus, there is an unmet need for a device capable of metering out such paper articles.

SUMMARY OF THE INVENTION

The present invention satisfies the aforementioned need by providing a paper metering device capable of receiving an inflow of randomly oriented, clumped, folded, bulky and/or unmanageable paper sheet articles such as newspapers, computer printouts, and file stock and discharging the articles as an even flow of manageable volume. The paper metering device is particularly suited for receiving such paper waste dumped from a bin and for feeding the paper to a shredder.

The device of the invention includes an inclined feed conveyor and a converging conveyor disposed above the feed conveyor near the discharge end of the feed conveyor. The converging conveyor extends along a substantial portion of the length of the feed conveyor so as to provide a peeling or declumping action over an area large enough for the metering of bulky paper sheet articles.

In a preferred embodiment, the converging conveyor includes a series of toothed disks rotating on several rotating shafts extending across and above the feed conveyor. Some or all of the disks may be mounted on the shafts canted at an angle to the axis of the shafts, thus providing a transverse peeling action which aids in the separation and metering of the layers of waste paper. In an alternate embodiment, the converging conveyor is a continuous belt.

In operation, the converging conveyor is normally continuously in motion. An irregular supply of paper on the feed conveyor is carried upward until the upper layers of paper contact the underside of the converging conveyor. Upward pressure exerted by the paper on the converging conveyor triggers a switch which stops the feed conveyor. The paper is then peeled or metered forward by the converging conveyor until the height of the paper on the feed conveyor is reduced. The switch then restarts the feed conveyor.

According to a feature of the invention, if the feed conveyor fails to restart within a predetermined period of time due to a paper jam at the converging conveyor, a controller briefly turns on the feed conveyor in order to clear the jam.

According to an additional feature of the invention, a pre-feed conveyor is provided. The pre-feed conveyor, which advances paper at a lower linear speed than the feed conveyor, is preferably a screw conveyor provided as a rotating, open-ended cylinder having internal helical vanes. The discharge end of the pre-feed conveyor is disposed above the infeed end of the feed conveyor. Waste paper is dumped on the infeed end of the pre-feed conveyor and carried forward and upward by the rotating vanes. Tumbling of the paper within the drum tends to break up clumps. The spacing of the turns of the internal vanes provides an initial metering of the paper into a more even flow. The paper falls off the discharge end of the pre-feed conveyor onto the infeed end of the feed conveyor. The fall and the faster speed of the feed conveyor relative to the pre-feed conveyor serve to further enhance the distribution of the paper into a less dense, more even and manageable flow.

These and other objects, advantages, and features of the present invention will be more fully understood and appreciated by reference to the written specification and appended drawings.

DESCRIPTION OF THE PREFERRED EMBODIMENT

Figure 1:
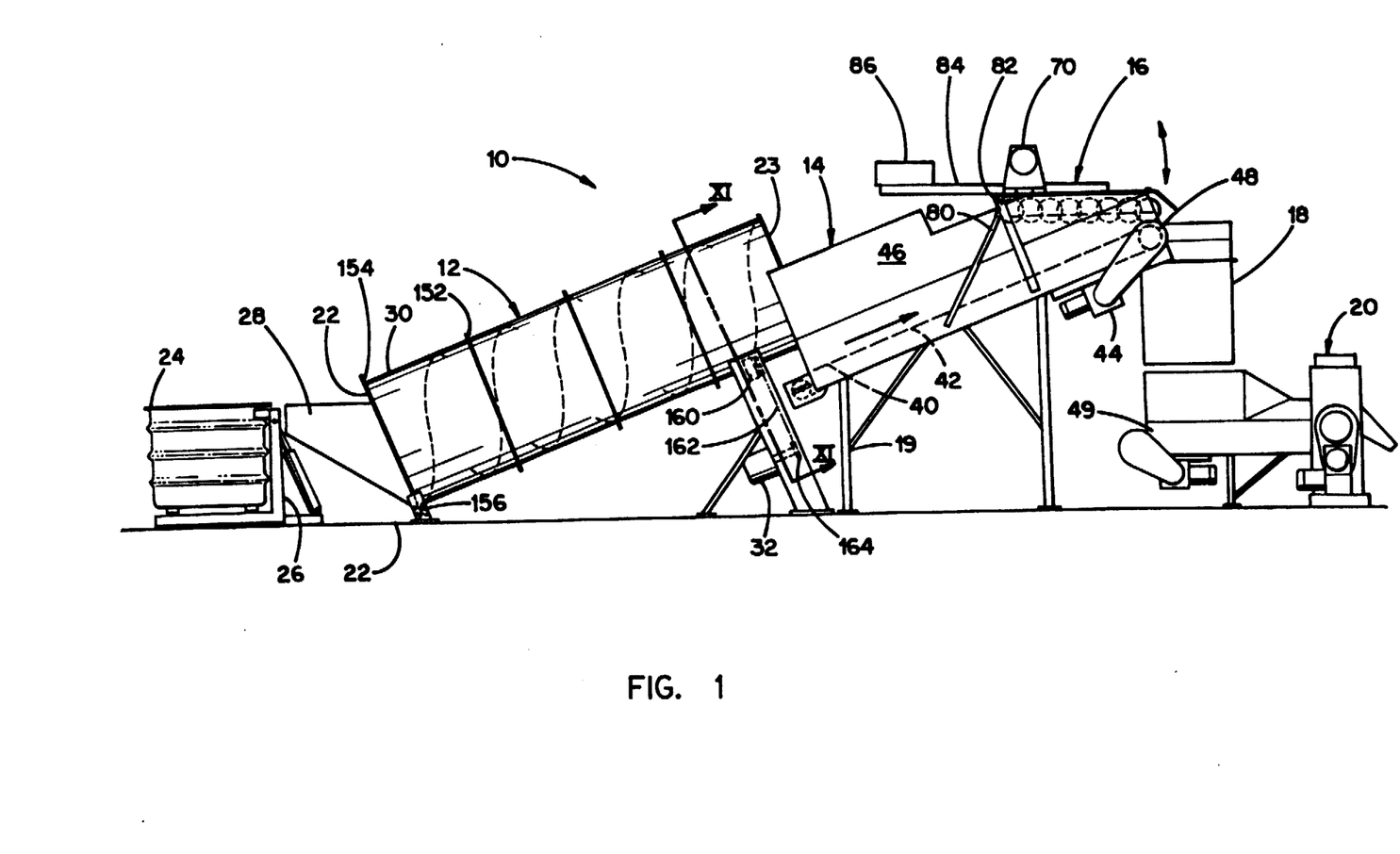
FIG. 1 is a side elevational view of a paper metering device according to the principles of the invention.

By way of disclosing a preferred embodiment of the invention, and not by way of limitation, there is shown in FIG. 1 a paper metering device 10 which includes in its general organization a pre-feed conveyor 12, a feed conveyor 14, a converging conveyor 16, a discharge chute 18, and a paper shredder 20. The conveyors 12 and 14 incline generally upwardly toward the discharge chute 18 and are supported on appropriate legs and braces such as at support 19. Waste paper such as old newspapers, fan-folded computer printouts, or file stock is brought to the infeed end 22 of the pre-feed conveyor in a bin 24. The bin is placed on a lifting device 26 which is able to lift the bin and dump its contents into an infeed hopper 28. Other suitable means for transporting and loading the waste paper may be employed such as a truck which dumps the paper directly into the infeed hopper.

Figure 10:
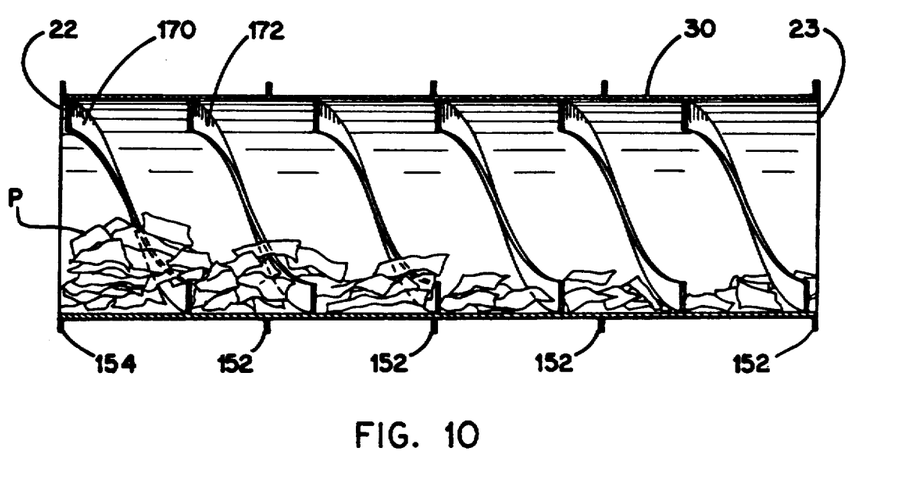
FIG. 10 is a sectional view taken along the longitudinal axis of the pre-feed conveyor cylinder.
Figure 11:
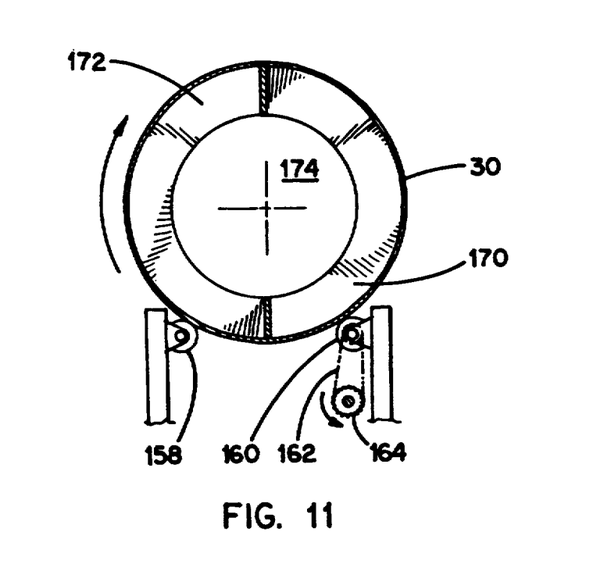
FIG. 11 is a sectional view taken along line 11—11 of FIG. 1.

Details of the construction and arrangement of the pre-feed conveyor are shown in FIGS. 1, 10 and 11. The pre-feed conveyor 12 is generally configured as an elongated, rotating cylinder 30 supported with its axis inclining upwardly from its infeed end 22 to its discharge end 23. External circumferential stiffener flanges 152 are provided at intervals along the cylinder. At the infeed end 22, stiffener flange 154 sits in the grooves of a pair of transversely spaced-apart grooved rollers 156.

Near the outfeed end 23, the external wall of the cylinder 30 rests upon transversely spaced-apart rollers 158, 160. Roller 158 is an idler, while roller 160 is rotatingly driven by a belt or chain 162 which, in turn, is driven by the sprocket 164 of motor 32. Roller 162 is in frictional contact with the outer wall of the cylinder 30, such that operation of the motor 32 causes roller 162 to rotate the cylinder 30 about its axis while the cylinder is rollingly supported by rollers 160, 162, and 156.

The cylinder 30 functions as a screw conveyor by the provision of two helical vanes 170, 172 affixed to the inner surface of the cylinder wall and extending radially into the interior of the cylinder. Thus, there is a continuous, longitudinal cylinder opening 174 of a diameter appropriate to the nature of the paper being handled.

As best shown in FIG. 10, when paper P enters the infeed end 22 of the pre-feed conveyor from the hopper 28, the paper is clumped and fills a substantial portion of the interior of the cylinder 30. Rotation of the cylinder causes the paper near the infeed end 22 to tumble. The motion of the helical vanes 170, 172 causes the lowermost layers of paper to be conveyed upward toward the discharge end 23. As a result, the paper is partially unclumped, and a metered flow is initiated.

When the paper on the pre-feed conveyor reaches the discharge end 23, the paper drops a vertical distance and lands on the infeed end 40 of feed conveyor belt 42. This drop serves to aid in further separating or loosening any masses of paper. The paper is thereafter further carried forward and upward by the feed conveyor belt. Driven by motor 44, the linear speed of the feed conveyor belt is preferably greater than the linear speed of the advancement of paper in the pre-feed conveyor 12 so as to spread the paper out into a flow of lesser density. The flow of paper is contained on the feed conveyor belt 42 by spaced apart side walls 46.

As the paper is carried upward by feed belt 42, it passes under the converging conveyor 16, the construction and operation of which are described below. Thereafter, the paper leaves the feed belt at its upper, discharge end 48. The paper falls into discharge chute 18 and on to another conveyor 49 which carries the paper into shredder 20.

Figure 2:
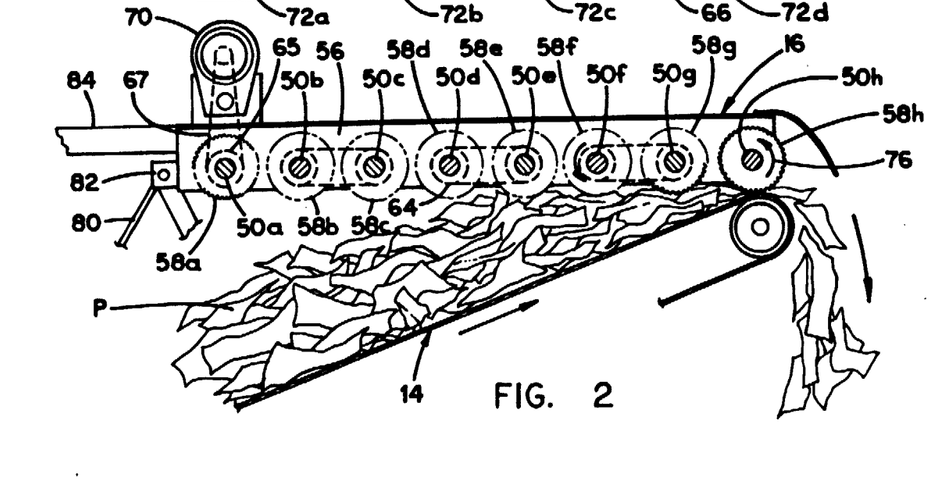
FIG. 2 is a fragmentary, sectional, elevational view of the discharge end of the feed conveyor and the converging conveyor.
Figure 3:
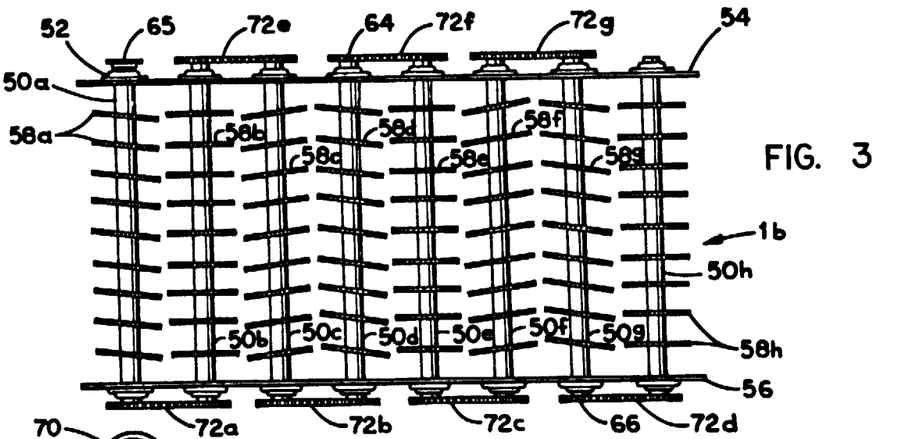
FIG. 3 is a top plan view of the converging conveyor with parts removed for clarity.
Figure 4:
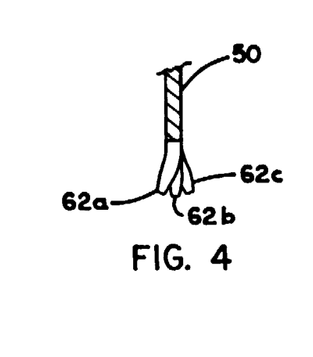
FIG. 4 is an enlarged, fragmentary, sectional view taken through a metering disk showing three circumferentially adjacent teeth thereof.

Referring now to FIGS. 2 and 3, the details of the converging conveyor and its cooperation with the feed conveyor may be seen. The converging conveyor 16 includes a series of shafts 50a–50h extending transversely across the line of travel of the feed conveyor 14, disposed generally co-parallel and spaced apart along the line of travel. The ends of the shafts are journalled on bearings such as bearings 52 carried on a frame having transversely spaced apart side walls 54, 56. Each shaft 50a–50h has a series of disks such as disks 58a–58h, respectively, fixed to the shaft at spaced intervals along the axis of the shaft for co-rotation with the shaft. Each disk 58a–58h has its perimeter formed with teeth. As shown in FIG. 4, the disk teeth are variously disposed in three different directions. A series of three adjacent teeth preferably is disposed with a first tooth 62a disposed outwardly from the plane of the disk, a second tooth 62b disposed radially, and a third tooth 62c disposed inwardly. This arrangement of the teeth aids in the grasping and metering action of the disks on the paper.

As shown in FIG. 3, some of the disks such as disks 58b, 58e, and 58h are disposed in planes perpendicular to the axis of the shaft on which they are mounted. The remaining disks 58a, 58c, 58d, 58f, and 58g are mounted in planes canted at a nonperpendicular angle to the axis of the shaft. Such canting of the disks creates a transverse oscillating action of the disks on the paper P which aids in separating layers of the paper and enhances the metering action of the device.

The ends of the shafts 50a–50h extend outwardly beyond the bearings 52 and are provided with sprockets fixed thereto such as sprockets 64, 66. Shaft 50h has a single sprocket at one end only. The sprockets of adjacent shafts 50a and 50b along the side wall 56 are drivingly joined by a drive chain 72a, as are shafts 50c and 50d by chain 72b, shafts 50e and 50f by chain 72c, and shafts 58g and 58h by chain 72d. Along opposite side wall 54, in a manner alternating with the chains 72a–72d, the sprockets of shafts 58b and 58c are drivingly joined by drive chain 72e, as are shafts 58d and 58e by chain 72f, and shafts 58f and 58g by chain 72g. Electric motor 70 is mounted to the sidewall 54 above sprocket 64 fixed to the end of shaft 50a. The shaft of motor 70 is drivingly connected to sprocket 65 by chain 67. With this arrangement, motor 70 causes all of the shafts to simultaneously rotate in a common direction indicated by arrow 76 which advances the paper toward the discharge end.

Referring now to FIGS. 1 and 2, the upstream end of the frame is connected to a supporting structure 80 by a pivot 82 extending along a transverse axis. This pivot arrangement allows the converging conveyor 16 to rotate up away from the feed conveyor 14 and down toward the feed conveyor. Extending upstream from the rear of the converging conveyor there is a cantilever 84 on top of which is mounted a counterweight 86.

The weight of the counterweight and its position along the length of the cantilever are adjustable so as to provide the proper degree of counterbalancing for the converging conveyor 16.

As shown in FIG. 2, as the flow of paper P reaches the upper extent of the feed conveyor 14, the topmost layers of the paper contact the lower extents of the disks 58a-58h. The disks rotate at a circumferential speed greater than the linear speed of the feed conveyor. This rotation of the disks acts to peel off the topmost layers of the paper and eject the paper in a uniform stream of manageable density out the discharge end of the feed conveyor and into the discharge hopper for further processing.

Figure 5:
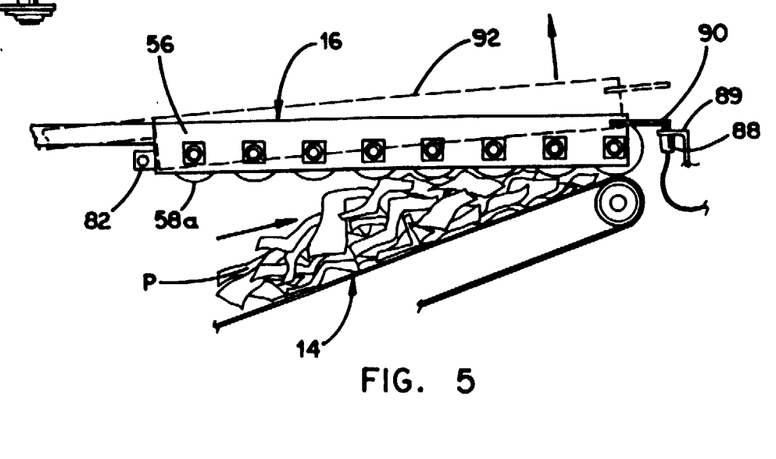
FIG. 5 is a fragmentary side elevational view of the discharge end of the feed conveyor and the converging conveyor with parts removed for clarity.

Referring additionally to FIG. 5, it may be seen that a spring loaded limit switch 88 is mounted to a stationary support 89 adjacent the downstream end of the converging conveyor frame side wall 56. A finger bar 90 is fixed to the downstream end of sidewall 56. When the converging conveyor is at an at rest position, the finger bar 90 lies upon the limit switch 88, keeping the switch in a closed condition. In this state, the feed conveyor 14 and the converging conveyor disks are in motion. When the flow of paper reaches a predetermined height, the force of the paper under the converging conveyor pushes the converging conveyor upward as indicated by broken lines at 92. The counterweight 86 (FIG. 1) may be adjusted to obtain a suitable pressure required to raise the converging conveyor.

When the converging conveyor is raised to a sufficient extent, the finger bar 90 is also raised away from the switch 88 thus tripping or opening the switch. The switch is electrically connected to suitable control devices which cause the motion of feed conveyor 14 and pre-feed conveyor 12 to stop while continuing the rotation of the disks 58a etc. When a sufficient amount of paper has been ejected, the converging conveyor lowers, again bringing the finger bar 90 into contact with switch 88 which restarts the pre-feed conveyor and feed conveyor. Preferably, switches 88 and finger bars 90 are employed at each downstream lateral side of the converging conveyor. The use of such a pair of switches allows for independent triggering of either switch in the event one side rises more than the other side due to flexing of the converging conveyor.

Figure 6:
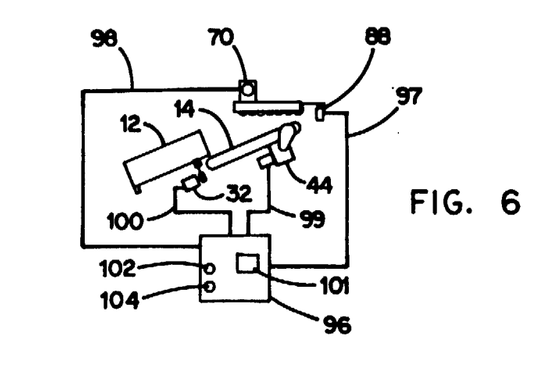
FIG. 6 is a schematic diagram of the control means of the paper metering device.

A schematic diagram of the control circuitry of the paper meter device is shown in FIG. 6. A controller 96 is provided having electrical connections 97, 98, 99, 100 to the converging conveyor switch 88, converging conveyor motor 70, feed conveyor motor 44, and pre-feed conveyor motor 32, respectively. As described above, tripping of switch 88 causes the controller to stop the conveyor motors 32 and 44. Controller 96 includes a timer 101. In the event the conveyors have been stopped by the triggering of switch 88 for a predetermined period of time, preferably about 10 seconds, timer 96 causes feed conveyor 14 to restart for a brief period then stop. This jogging of the feed conveyor serves to assist in releasing any paper jams which might otherwise prevent the restarting of the conveyors. Controller 96 further includes a manual on/off switch 102 and a manual jog switch 104 which momentarily restarts the feed conveyor as described above.

Figure 7:
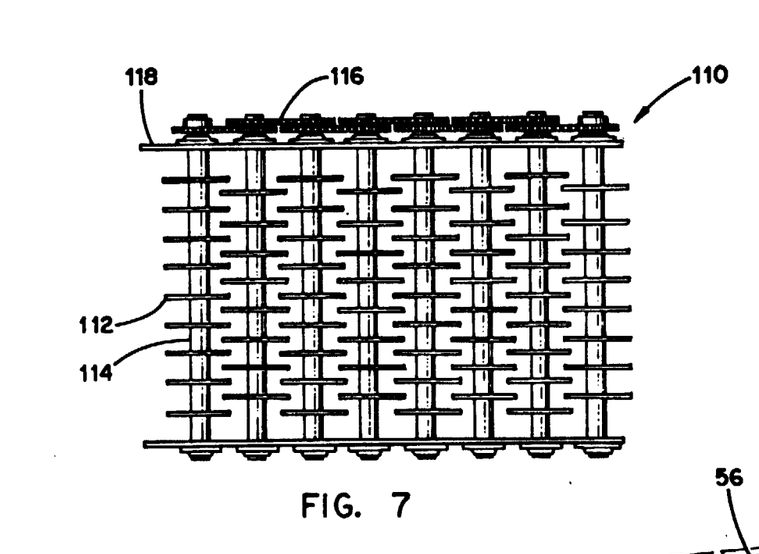
FIG. 7 is similar to FIG. 3, but shows an alternate embodiment of the converging conveyor.

FIG. 7 shows an alternative arrangement of the converging conveyor 110. In this embodiment, each of the disks such as disk 112 is disposed perpendicularly to the shaft on which it is mounted such as shaft 114. The shafts are spaced such that circumferences of the disks on adjacent shafts overlap. Also the gear and chain driving arrangement 116 is disposed outwardly of the converging conveyor frame side wall 118.

Figure 8:
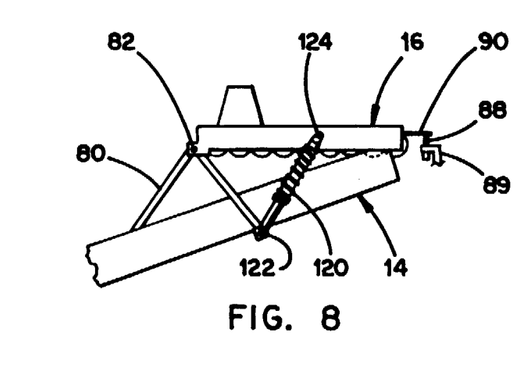
FIG. 8 is a fragmentary, side, elevational view illustrating an alternate embodiment of the mounting of the converging conveyor to the feed conveyor.

FIG. 8 shows an alternative structure for supporting the converging conveyor above the feed conveyor 14. In this embodiment, the upstream end of the converging conveyor 16 is connected by a pivot 82 to supports 80 as described previously. However, the cantilever and counterweight as shown in FIG. 1 are absent. There are a pair of struts 120, one of which is disposed at each transverse side of the converging conveyor. The struts extend from a connection to the feed conveyor at 122 to a connection to the converging conveyor side wall at 124. The struts are telescoping and spring loaded, allowing the converging conveyor to pivot up and down.

Figure 9:
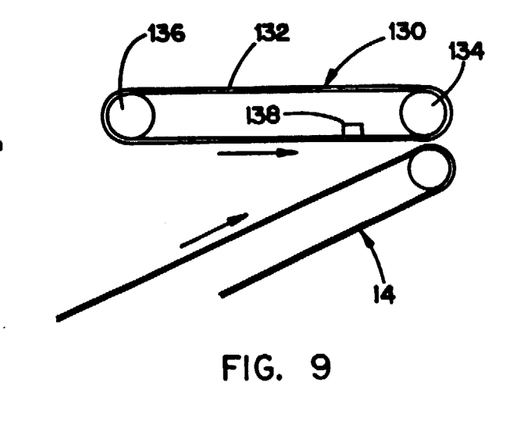
FIG. 9 is a fragmentary, diagrammatic, sectional, elevational view of a second alternate embodiment of the converging conveyor.

FIG. 9 discloses an additional alternative arrangement of the converging conveyor 130. In this arrangement, the converging conveyor is provided as an endless belt 132 supported on end rollers 134, 136. The belt 132 may be carried in a pivotable frame as described above. The frame may carry a switch such as switch 88 (FIG. 5) for stopping and starting the feed conveyor 14. Furthermore, a pressure switch 138 may be provided above and adjacent the lower run of the belt 132. When a sufficiently high flow of paper on the feed conveyor 14 presses upward against the belt 132, pressure switch 138 is triggered, thus causing the feed conveyor 14 to stop in a manner similar to that of the switch 88.

The above description is that of a preferred embodiment of the invention. Various alterations and changes can be made without departing from the spirit and broader aspects of the invention as set forth in the appended claims, which are to be interpreted in accordance with the principles of patent law, including the Doctrine of Equivalents.

The embodiments of the invention in which an exclusive property of privilege is claimed are defined as follows:

1. A paper metering device comprising:
   an inclined feed conveyor for carrying a flow of paper and having an upstream infeed end and a downstream discharge end longitudinally spaced apart from said infeed end;
   means for driving said feed conveyor to carry said flow of paper upward toward said discharge end;
   a converging conveyor disposed above said feed conveyor adjacent said discharge end and extending longitudinally along a substantial portion of the length of said feed conveyor, said converging conveyor having an upstream end spaced apart at a first distance from an intermediate portion of said feed conveyor and a downstream end disposed at a second distance from said discharge end of said feed conveyor, said second distance being less than said first distance, said converging conveyor including means disposed substantially along its entire length for advancing uppermost layers of paper carried on said feed conveyor downstream past said discharge end;
   said means for advancing comprising a plurality of drivingly rotated shafts extending axially transversely across said feed conveyor and disposed apart along the length of said converging conveyor, each of said shafts carrying a plurality of disks mounted for co-rotation thereon disposed spaced apart along the length of the shaft, the circumference of said disks being adapted for contacting and advancing said uppermost layers of paper, at least some of said disks being mounted in planes disposed at a nonperpendicular angle to the axis of the shafts on which they are carried.

2. The paper metering device of claim 1 wherein at least some of said disks are mounted in planes disposed perpendicularly to the axis of the shafts on which they are carried.

3. The paper metering device of claim 1 wherein the circumferences of said disks are formed with a plurality of teeth.

4. The paper metering device of claim 3 wherein said teeth are disposed variously radially, laterally outwardly, and laterally inwardly.

5. The paper metering device of claim 1 wherein said upstream end of said converging conveyor is mounted on a pivot whereby said downstream end of said converging conveyor is movable upward and downward in response to forces exerted by the height of a flow of paper on said feed conveyor.

6. The paper metering device of claim 5 further comprising means for sensing upward and downward movement of said converging conveyor.

7. The paper metering device of claim 6 further comprising a control means, said control means having means responsive to said means for sensing for stopping said feed conveyor when said converging conveyor has moved upwardly and for restarting said feed conveyor when said converging conveyor returns downwardly.

8. The paper metering device of claim 7 wherein said control means further includes means for momentarily restarting said feed conveyor in the event said converging conveyor does not return downwardly after a predetermined period of time.

9. The paper metering device of claim 1 further comprising a pre-feed conveyor disposed upstream of said feed conveyor, said pre-feed conveyor having an infeed end adapted for receiving a flow of paper and a discharge end disposed spaced above said infeed end of said feed conveyor, whereby paper carried on said pre-feed conveyor drops a distance from the discharge end of said pre-feed conveyor on to the feed conveyor.

10. The paper metering device of claim 9 wherein said pre-feed conveyor comprises an inclined cylinder drivingly rotated about its axis, said cylinder having internal helical vane means for carrying said paper longitudinally therethrough.

11. The paper metering device of claim 9 wherein said pre-feed conveyor carries said flow of paper at a linear speed less than the linear speed of said feed conveyor.

12. The paper metering device of claim 1 wherein said converging conveyor is supported about a transverse axis on a pivotable mounting.

13. The paper metering device of claim 12 wherein said converging conveyor further comprising a cantilever extending upstream from said pivotable mounting and a counterweight carried on said cantilever.

14. A paper metering device comprising:
an inclined feed conveyor for carrying a flow of paper and having an upstream infeed end and a downstream discharge end longitudinally spaced apart from said infeed end;
means for driving said feed conveyor to carry said flow of paper upward toward said discharge end;
a converging conveyor disposed above said feed conveyor adjacent said discharge end and extending longitudinally along a substantial portion of the length of said feed conveyor, said converging conveyor having an upstream end spaced apart at a first distance from an intermediate portion of said feed conveyor and a downstream end disposed at a second distance from said discharge end of said feed conveyor, said second distance being less than said first distance, said converging conveyor including means disposed substantially along its entire length for advancing uppermost layers of paper carried on said feed conveyor downstream past said discharge end;
said means for advancing comprising a plurality of drivingly rotated shafts extending axially transversely across said feed conveyor and disposed spaced apart along the length of said converging conveyor, each of said shafts carrying a plurality of disks mounted for co-rotation thereon disposed spaced apart along the length of the shaft, the circumferences of said disks being adapted for contacting and advancing said uppermost layers of paper and formed with a plurality of teeth, said teeth being disposed variously radially, laterally outwardly, and laterally inwardly.

15. The paper metering device of claim 14 wherein at least some of said disks are mounted in planes disposed perpendicularly to the axis of the shafts on which they are carried.

16. The paper metering device of claim 14 wherein at least some of said disks are mounted in planes disposed at a nonperpendicular angle to the axis of the shafts on which they are carried.

17. The paper metering device of claim 14 wherein said upstream end of said converging conveyor is mounted on a pivot whereby said upstream end of said converging conveyor is movable upward and downward in response to forces exerted by the height of a flow of paper on said feed conveyor.

18. The paper metering device of claim 17 further comprising means for sensing upward and downward movement of said converging conveyor.

19. The paper metering device of claim 18 further comprising a control means, said control means having means responsive to said means for sensing for stopping said feed conveyor when said converging conveyor has moved upwardly and for restarting said feed conveyor when said converging conveyor returns downwardly.

20. The paper metering device of claim 19 wherein said control means further includes means for momentarily restarting said feed conveyor in the event said converging conveyor does not return downwardly after a predetermined period of time.

21. The paper metering device of claim 14 further comprising a pre-feed conveyor disposed upstream of said feed conveyor, said pre-feed conveyor having an infeed end adapted for receiving a flow of paper and a discharge end disposed spaced above said infeed end of said feed conveyor, whereby paper carried on said pre-feed conveyor drops a distance from the discharge end of said pre-feed conveyor on to the feed conveyor.

22. The paper metering device of claim 21 wherein said pre-feed conveyor comprises an inclined cylinder drivingly rotated about its axis, said cylinder having internal helical vane means for carrying said paper longitudinally therethrough.

23. The paper metering device of claim 21 wherein said pre-feed conveyor carries said flow cf paper at a linear speed less than the linear speed of said feed conveyor.

24. The paper metering device of claim 14 wherein said converging conveyor is supported about a transverse axis on a pivotable mounting.

25. The paper metering device of claim 24 wherein said converging conveyor further comprises a cantilever extending upstream from said pivotable mounting and a counterweight carried on said cantilever.

26. The paper metering device of claim 24 further comprising telescoping supports disposed downstream of said pivotable mount extending between said converging conveyor and said feed conveyor.

27. A paper metering device comprising:
an inclined feed conveyor for carrying a flow of paper and having an upstream infeed end and a downstream discharge end longitudinally spaced apart from said infeed end;
means for driving said feed conveyor to carry said flow of paper upward toward said discharge end;
a converging conveyor supported about a transverse axis on a pivotable mounting and disposed above said feed conveyor adjacent said discharge end and extending longitudinally along a substantial portion of the length of said feed conveyor, said converging conveyor having an upstream end spaced apart at a first distance from an intermediate portion of said feed conveyor and a downstream end disposed at a second distance from said discharge end of said feed conveyor, said second distance being less than said first distance, said converging conveyor including means disposed substantially along its entire length for advancing uppermost layers of paper carried on said feed conveyor downstream past said discharge end said converging conveyor further comprising a cantilever extending upstream from said pivotable mounting and a counterweight carried on said cantilever.

28. The paper metering device of claim 27 further comprising telescoping supports disposed downstream of said pivotable mount extending between said converging conveyor and said feed conveyor.

29. The paper metering device of claim 27 wherein said converging conveyor comprises an endless belt having a lower run disposed overlying said flow of paper.

30. The paper metering device of claim 29 further comprising means for sensing upward pressure exerted against said lower run of said belt by paper carried on said feed conveyor.

31. The paper metering device of claim 30 further comprising control means responsive to said means for sensing upward pressure for stopping the movement of said feed conveyor until said pressure is relieved.

32. The paper metering device of claim 27 wherein said means for advancing comprises a plurality of drivingly rotated shafts extending axially transversely across said feed conveyor and disposed substantially parallel and spaced apart along the length of said feed conveyor, each of said shafts carrying a plurality of disks mounted for co-rotation thereon disposed spaced apart along the length of the shaft, the circumference of said disks being adapted for contacting and advancing said uppermost layers of paper.

33. The paper metering device of claim 32 wherein at least some of said disks are mounted in planes disposed at a nonperpendicular angle to the axis of the shafts on which they are carried.

34. The paper metering device of claim 32 wherein the circumferences of said disks are formed with a plurality of teeth, said teeth being disposed variously radially, laterally outwardly, and laterally inwardly.

35. The paper metering device of claim 27 further comprising means for sensing upward and downward movement of said converging conveyor, and a control means responsive to said means for sensing for stopping said feed conveyor when said converging conveyor has moved upwardly and for restarting said feed conveyor when said converging conveyor returns downwardly.

36. The paper metering device of claim 35 wherein said control means further includes means for momentarily restarting said feed conveyor in the event said converging conveyor does not return downwardly after a predetermined period of time.

* * * * *

UNITED STATES PATENT AND TRADEMARK OFFICE
CERTIFICATE OF CORRECTION

PATENT NO. : 5,129,505

DATED : July 14, 1992

INVENTOR(S) : Gregory C. Winter et al.

It is certified that error appears in the above-identified patent and that said Letters Patent is hereby corrected as shown below:

Column 6, line 63;
  before "apart" insert --spaced--.

Column 9, line 33;
  after "end" insert --,--.

Signed and Sealed this

Tenth Day of August, 1993

Attest:

MICHAEL K. KIRK

*Attesting Officer*     *Acting Commissioner of Patents and Trademarks*